Jan. 15, 1963 D. B. FLAVAN, JR 3,074,059

MULTI-SEQUENCE PULSE CODE TRANSMITTER

Filed Aug. 16, 1956 2 Sheets-Sheet 1

INVENTOR:
DAVID B. FLAVAN, JR.
BY Bruninga & Sutherland
ATTORNEYS.

INVENTOR:
DAVID B. FLAVAN, JR.
By Bruninga & Sutherland
ATTORNEYS.

United States Patent Office 3,074,059
Patented Jan. 15, 1963

3,074,059
MULTI-SEQUENCE PULSE CODE TRANSMITTER

David B. Flavan, Jr., 10259 St. Charles Rock Road, St. Anns, Mo.

Filed Aug. 16, 1956, Ser. No. 604,545
11 Claims. (Cl. 340—365)

This invention relates to an automatic push-button operated device for selectively transmitting coded pulse trains by closing or interrupting an electrical circuit in a predetermined sequence. My invention has many uses in the field of remote-control equipment, digital computers, and communications, but it is particularly useful as a push-button operated automatic dialing system for use with conventional dial-type telephone equipment. It has long been realized that it is desirable to provide means by which numbers that are often dialed by the user of a telephone during the business day can be dialed automatically by merely pushing a button, thereby preventing loss of time and misdialing of numbers. Many solutions to this problem have been proposed in the past but all have involved either costly mechanical apparatus for physically rotating the dial of the telephone instrument or have involved the use of rotating discs equipped with pins, notched wheels, or punched elements, all of which are difficult for the user to set up and maintain.

The primary object of this invention is to provide a device for automatically producing a series of coded pulse trains in response to a single actuating operation.

Another object of this invention is to provide a reliable and economical method of providing push-button dialing for automatic telephones.

A still further object of this invention is to provide a push-button operated automatic pulse transmitting system on which the codes to be transmitted can be easily and quickly set by the user without the use of tools, accessory equipment, or specially prepared parts.

It is also an object of this invention to provide a push-button dialing system which can be easily disconnected from the telephone instrument, and which even when connected does not interfere in any way with the normal operation of the telephone instrument.

If, as a matter of illustration, my invention is to be used for automatic dialing, I construct my device as an attachment to be inserted in a telephone line in conjunction with a conventional telephone instrument although it is to be understood that my device could just as easily be incorporated in the telephone instrument itself. The basis for the operation of my device is found in the principle of operation of the dial telephone. Each subscriber's number (i.e. group of signals) is represented by seven digits (i.e. signals), the first two being expressed as letters in the name of the exchange, and the other five being expressed as numerals. However, each letter on the telephone dial corresponds to a distinct numeral so that the dialing of a customer's number actually involves the dialing of seven consecutive numerals. Each of the desired numerals is transmitted to the central office by a series of interruptions of the electrical circuit through the telephone instrument, the numeral one being represented for example by one interruption, numeral two by two interruptions, and so on to zero, which is represented by ten interruptions. In order to signify a particular numeral these interruptions must occur very close together as the central office equipment will ready itself to receive another numeral if there is a substantial lapse of time between interruptions of the circuit.

A particular preferred embodiment of my invention is illustrated in the accompanying drawings wherein.

Figures 1, 3, 4A, 4B:
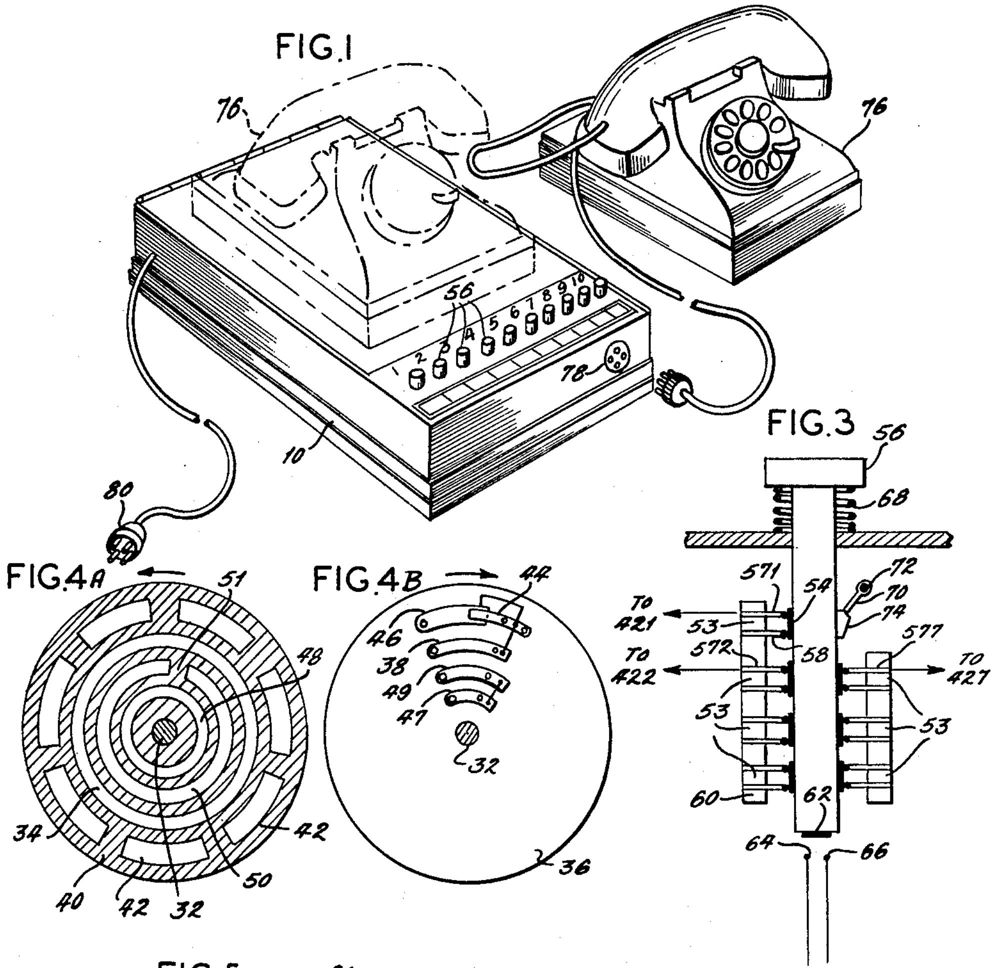
FIGURE 1 is a perspective exterior view of the device of this invention.
FIGURE 3 is a schematic view of the push-button or plunger used in my invention.
Figure 5:
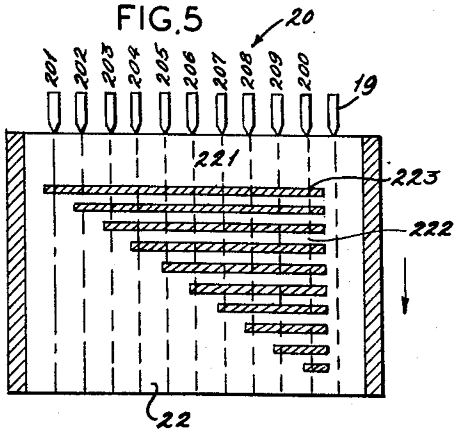
Figure 6:
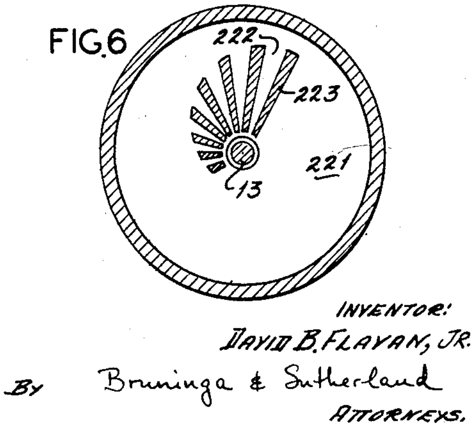
Figures 2, 7, 8:
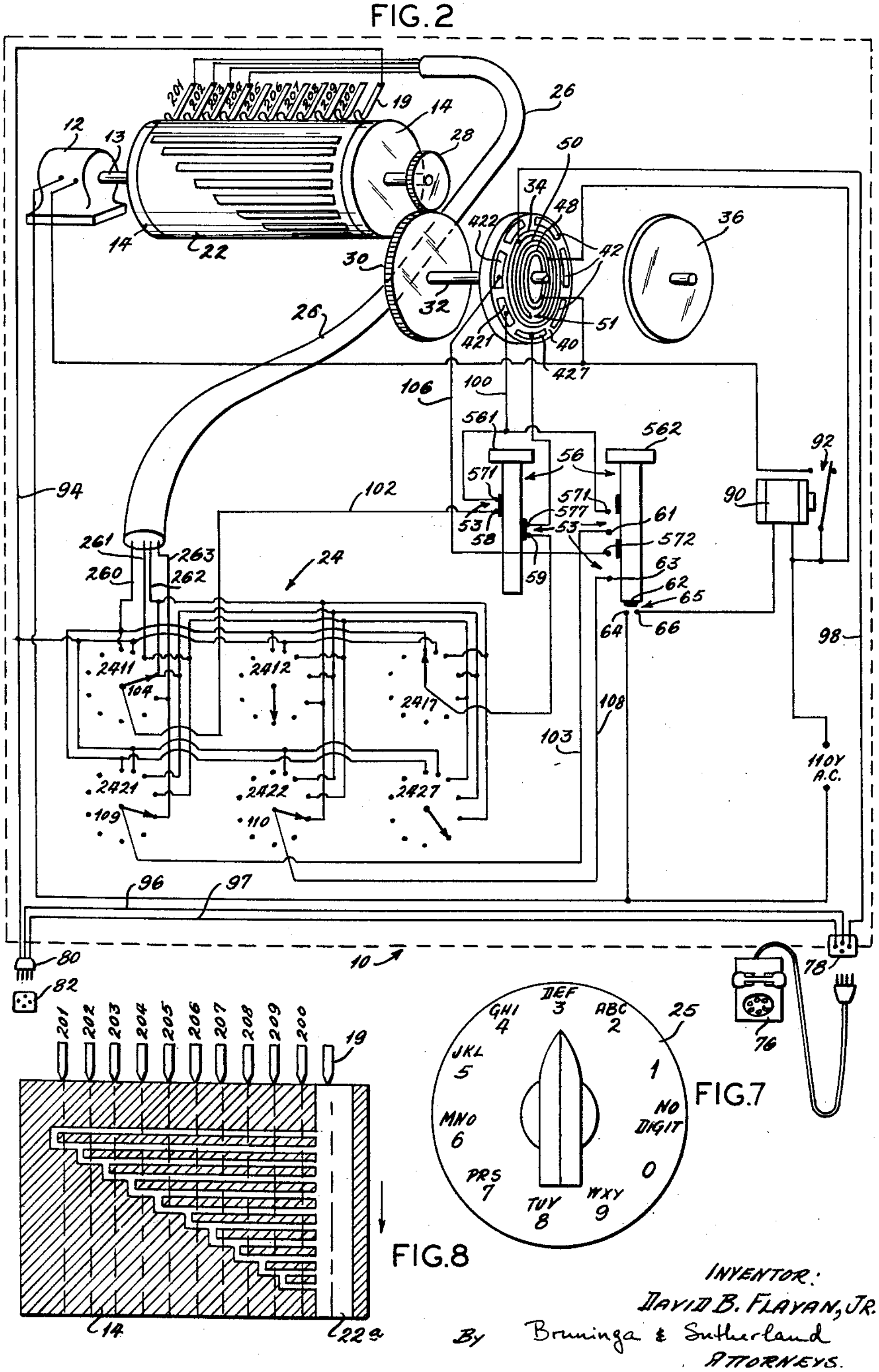
FIGURE 2 is an overall diagram showing the relation of the various parts of my device to each other.

FIGURE 4*a* is a right elevation of the stationary part of the never-break distributor;

FIGURE 4*b* is a left elevation of the wiper assembly of the never-break distributor;

FIGURE 5 is a development of the drum shown in FIGURE 2;

FIGURE 6 is a plan view of a disc which can be used in another embodiment of my invention;

FIGURE 7 is a plan view of one of the multi-position switches used in my device, as it would appear to the user; and FIGURE 8 is a development of the drum of FIGURE 2 as modified for another application.

In FIGURE 2, the device of my invention is generally designated by the numeral 10. A motor 12 adapted for operation from the 110 volt power line or any other locally available power supply rotates an interrupter or signal-producing member 14 shown in FIGURE 2 as a drum at about one revolution per second through a shaft 13. Affixed onto the surface of the drum 14 is a slotted metal plate 22 as shown in FIGURE 5 and for a purpose to be hereinafter described. The plate 22 may be affixed to the surface of the drum 14 by any convenient process. It is to be understood that instead of a drum, I may use any other type of interrupter member adapted for cyclical interruption of a circuit in a number of preset patterns, such as a disc like the one shown in FIGURE 6, a plurality of discs, or a cam member operating a series of fast-acting switch members. An electrical connection is brought out from the plate 22 through the contact finger 19. Riding on the surface of the drum 14 in the embodiment of FIGURE 2 are ten contact fingers or signal-producing elements 200 through 209. Each of these contact fingers or wipers rides on a separate path across plate 22 (FIGURE 4) and is connected to a corresponding one of the terminals on each of switches 24, by means of cable 26.

Mounted on the same shaft as drum 14 is a gear train composed of gears 28 and 30. These gears provide a demultiplication in the ratio of one to seven. Consequently, gear 30 will make one revolution for each seven revolutions of interrupter member 14. Gear 30 is adapted to turn shaft 32 on which is mounted a wiper assembly 36 for rotation therewith. Though shown apart from distributor 40 in FIGURE 2 for clarity, assembly 36 is actually positioned very close to distributor 40 and cooperates with it as a unit.

Mounted concentrically with shaft 32, but in a fixed position, is never-break distributor or sequencing device 40. This distributor consists of a circular insulating disc in which are embedded seven metal contacts 42 and three slip rings 34, 48, and 50. Connecting leads for these elements, though shown on the front of distributor 40 in FIGURE 2, are actually brought to the rear of element 40 to be connected to the mounting studs of the contacts and slip rings, so as not to interfere with the wipers. Wiper assembly 36 is rotated by shaft 32 so that its wipers slide over contacts 42 and slip rings 34, 48, and 50. The wiper assembly 36, which is in the form of a disc of insulating material, is provided (near its periphery) with two wipers 44 and 46, more clearly shown in FIGURE 4. Leading wiper 44 will always engage the next one of contacts 42 before trailing wiper 46 leaves the previous contact. Wipers 44 and 46 are mounted so as to be mechanically independent, so that they are able to follow any unevenness in the contacts 42 without breaking the circuit. A third wiper 38 is arranged to make contact with the slip ring 34 of distributor 40. Wipers 38, 44, and 46 are electrically connected together. Another wiper 47 of wiper assembly 36 rides on the inner slip ring 48 of distributor 40, while a wiper 49 rides on a third slip ring 50 which is provided with a break 51 so located on distributor 40 that the circuit of wiper 49 is broken at the moment when wiper 44 has just reached contact 421 and wiper 46 is just about to leave contact 427, for a reason to be hereinafter described. Wipers 47 and 49 are electrically connected together. Instead of elements 47–51, a cam could be provided on wiper assembly 36 so as to open a normally closed microswitch once during each revolution of wiper assembly 36.

It is to be understood that a bank of cam-actuated microswitches or any other sequencing device may be used instead of the distributor 40 and wiper assembly 36, as the distributor basically performs a switching-type function.

Each of the seven contacts 42 is connected to one of the terminals 571 through 577 of the seven pairs of switch contacts 53 associated with each of the push-buttons or group selectors 56, known in the trade as plungers, more clearly shown in FIGURE 3. Only two plungers, each with only two switch contact pairs, are shown in FIGURE 2 for clarity. The other terminal of each of the switch contact pairs 53 is connected to the center of one of switches or signal selectors 24. For example, contact 58 is connected to the center 104 of switch 2411, contact 59 similarly to switch 2417, contact 61 to switch 2421, contact 63 to switch 2422, and so on. It should be understood that the terminals of the switch contacts 53 of plunger 561 are connected to the switch array 2411 through 2417, those of plunger 562 are connected to the switch array 2421 through 2427, and so on.

Switches 24 are single-pole eleven position switches, preferably of the miniature rotary type, each of the first ten positions corresponding to one of the ten numerals one through zero on a telephone dial, and the last position being reserved for a use to be hereinafter described. All the switches 24 are connected in parallel, and wires 260–269 of cable 26 are in turn connected to the first ten terminals of switch 2411, the eleventh terminal being connected to wire 94. Switches 24 may be provided with appropriate marker discs 25 (FIGURE 7) resembling a telephone dial, so that the user may see at a glance the setting of each switch. At the other end of cable 26, wires 260–269 are connected, respectively, to contact fingers 200–209. Although only three switches are shown for each plunger for the sake of clarity, it will be seen that seven switches 24 corresponding to the seven digits of the telephone number, are required for each plunger 56, the number of plungers being limited only by the permissible size of the device.

In this respect, it is of course possible to mount the plunger in a separate housing connected by a cable to the rest of the dialing device mounted at a remote location, thus saving desk or switchboard space.

Plungers 56 may be of any type adapted to close seven separate circuits when depressed. FIGURE 2 schematically shows one of the plungers 56. Contact terminals 571 and 58 are mounted on a stationary yoke 60. When a plunger 56 such as, for example 561, is depressed, switching bar 54 slides into place adjacent contacts 571 and 58, and connects them together. Each contact pair 53 is insulated from each other contact pair so that depressing a plunger 56 will simultaneously close seven separate circuits. Override switching bar 62 is arranged to momentarily close the circuit between contacts 64 and 66 as the plunger is fully depressed. As soon as pressure on the plunger 56 is released, the spring 68 returns plunger 56 to the position where the circuit through contacts 64 and 66 is open, but the other seven circuits are closed. A single latch means 70 extending along all the plungers 56 is urged into engagement with cams 74 on the plungers by spring 72 and prevents the return of the depressed plunger to its fully open position until another one of plungers 56 is depressed and on its downstroke disengages latch means 70. It will be noted from the above description that in the operation of the device, one of the plungers 56 remains depressed at all times whether the device is in use or not.

If the device is used with equipment on which a single interruption breaks the dial tone, the plungers must be so constructed that all the circuits of the plunger being depressed close before latch 70 is released and remain closed during the override which closes contacts 64 and 66.

The closing of the circuit through contacts 64 and 66 energizes delay relay 90, which is so constructed that its normally open contacts 92 will close as soon as the coil of relay 90 is energized, but will not open again until a few seconds after the coil has become de-energized. Instead of using a delay relay, two conventional relays may be so connected that the first is closed upon the override of a plunger 56, and the second prevents the first from reopening until wiper 49 has once again made contact with slip ring 50. Contacts 92 are connected in parallel with slip rings 48 and 50 of distributor 40 and this parallel circuit is connected in series with motor 12, so that motor 12 will become energized when the override of a plunger 56 momentarily closes the coil circuit of relay 90, and will remain energized through contacts 92 for a few seconds. In the meanwhile, motor 12, through gears 28 and 30, starts to rotate wiper assembly 36, wiper 49 of which has previously come to rest on break 51 of slip ring 50, thus closing the circuit through slip ring 48, wipers 47 and 49, and slip ring 50. When contacts 92 eventually open, the motor circuit is maintained closed through this circuit until assembly 36 has completed a full revolution and break 51 in slip ring 50 once again opens the circuit of wiper 49.

As an alternative to the use of override switch 65 and relay 90, it would of course be possible to merely short out slip rings 48 and 50 by a separate starter button until the movement of assembly 36 closes the circuit between slip rings 48 and 50.

The interruption of the telephone circuit can be achieved in a variety of different ways according to my invention. As an example, FIGURE 2 shows an embodiment in which the interrupting members is a drum. The development of the surface of the drum is shown in FIGURE 5 where the reference numeral 22 designates a slotted metal contact plate applied to the surface of an insulating drum 14. It will be noted that the contact plate 22 is composed of a solid portion 221 followed, in the direction of wiping as indicated by the arrow in FIGURE 5, by a series of narrow slots 223 separated by metallic strips 222, each slot being shorter in a transverse direction than the previous one. As can be seen by the dotted lines representing the wiping paths of contact fingers 20, the contact finger such as 200 would make contact with plate 22 during a substantial portion of the drum's rotation, but would interrupt the circuit ten times in rapid succession at one particular portion of the drum's rotational cycle. The rotational speed of the drum being constant, the duration of each interruption is of course determined by the width of the slots 223, and the interval between interruptions by the width of the metal strips 222. It will be noted from FIGURE 5 that there are ten interruptions in the path of contact finger 200; nine interruptions in that of contact finger 209 and so forth until there is only one interruption in the path of contact finger 201. It will therefore be seen that the circuit through the drum will be interrupted ten times for each rotation of the drum if the current is fed in through contact finger 200, nine times if it is fed in through contact finger 209, and once if the current is fed in through contact finger 201. Contact finger 19 remains in contact with plate 22 at all times.

In operation, a telephone instrument 76 of the plug-in type is plugged into the automatic dialing device at 78. The device is provided with a male plug 80 which fits the regular telephone line socket 82, so that if desired the device may be easily removed from the circuit and the telephone instrument 76 plugged directly into the line outlet 82. When the device is at rest, interrupter member 14 is so positioned that all contact fingers are riding on the solid portion 221 of contact plate 22. Wiper assembly 36 is so positioned that wipers 44 and 46, respectively, are in contact with contacts 421 and 427 of never-break distributor 40 which represent the first and the last of the seven digits making up a telephone number. Wiper 49 is resting on the break 51 in slip ring 50 and delaying relay 90 is de-energized so that its contacts 92 are also open. As both the circuit through slip rings 48 and 50 and contacts 92 are open, no power is delivered to motor 12. In this condition, the telephone circuit through the device 10 is closed in the following manner:

The current from one side of the telephone line enters through wire 96 and goes directly through plug 78 to the telephone instrument 76. Wire 97 is a ground connection for the telephone instrument. If the telephone receiver is off the hook in preparation for making a call, the circuit through instrument 76 is closed and the current re-enters the device 10 through plug 78 and wire 98 to slip ring 34. From there the current is picked off by wiper 38 (FIGURE 4*b*) and goes through wipers 44 and 46 to contacts 421 and 427 on the never-break distributor 40. From contact 421, the electric current goes through line 100 to contacts 571 of the upper-most switching section of each of plungers 56. Assuming plunger 561 is depressed, its circuits are closed and the current can travel from contact 571 of plunger 561 to contact 58 and from there through line 102 to the center terminal 104 of rotary switch 2411. Assuming further that rotary switch 2411 is, for example, in the position where its center contact 104 is connected to the position terminal connected to wire 262 of cable 26, leading to contact finger 202, current will flow from the switch 2411 through cable 26 to contact finger 202. Since contact finger 202 is at this moment resting on the portion 221 of contact plate 22, the circuit will be continued through plate 22 to contact finger 19 from where it goes through line 94 and plug 80 to the other side of the telephone line. The circuit is also closed in a similar manner from contact 427 through contacts 577 and 59 of plunger 561, switch 2417, wire 260 and contact finger 200 on interrupter member 14, which is also resting on portion 221 of contact plate 22.

It will be seen that when the device of this invention is at rest the circuit from the telephone instrument to the telephone line is closed and the telephone instrument can therefore be used in the regular manner. If it is now desired to dial a given number automatically, the corresponding one of plungers 56, say plunger 562, is depressed. This action releases all other plungers and closes the seven circuits associated with plunger 562. In addition, as the plunger is pressed down, override switch 65 of plunger 562 closes the circuit of the relay 90. As plunger 562 is released, its override switch 65 opens again but plunger 562 stays depressed due to locking means 70 and thus continues to close the seven other circuits associated with it. As soon as contacts 92 of delaying relay 90 close, electrical energy from a power source (not shown) is delivered to motor 12. Motor 12 therefore starts to turn and through shaft 13 rotates interrupter member 14, gears 28 and 30, shaft 32, and wiper assembly 36. A slight amount of rotation will move wiper 49 off break 51 and thus close the circuit through slip ring 50 so that when contacts 92 of delay relay 90 open again, the power supply to the motor is maintained through elements 47–50. As wiper assembly 36 starts to rotate around never-break distributor 40, wiper 46 which was resting on contact 427 moves off contact 427 toward contact 421. At this time the circuit from the telephone is closed only through line 100, terminal 571 of push-button 562 and line 103 to center terminal of switch 2421. We will assume that switch 2421 is set so that the circuit is continued from the center terminal 109 through the appropriate switch contact and wire 263 to contact finger 203. At this point contact finger 203 in sliding along contact plate 22 reaches the three slots 223 in its path and therefore interrupts the telephone circuit momentarily three times in quick succession. This has the effect, at the telephone company's central office, of dialing the number 3 which corresponds to the letters D, E, or F on the telephone dial. As the interrupter member 14 completes its first rotational cycle, gears 28 and 30 have caused contact finger 36 to move one-seventh of a turn from its initial position. At this point, contact wiper 44 engages contact 422 and shortly thereafter wiper 46 leaves contact 421. The circuit from the telephone instrument is now completed through lead 106 to the contact 572 of plunger 562, and from there through contact 63 and lead 108 to the center terminal 110 of switch 2422. Assuming that switch 2422 is also in a position so as to connect center terminal 110 through wire 263 to contact finger 203, the telephone circuit will now again be closed through contact finger 203 during the second rotation of interrupter number 14. In the same manner as heretofore described, the telephone circuit will therefore be interrupted three times during the second rotation of member 14. It will be seen that the device has now again dialed numeral 3 which corresponds to the letters D, E, or F on the telephone dial, so that connection to the DEarborn exchange, for example would now be established. In a similar manner, the device will dial the remaining five digits of a telephone number as set up on the seven rotary switches 24 corresponding to the seven contact sections of the depressed plunger 562. When interrupter member 14 has completed its seventh rotation and the telephone number is therefore completely dialed, wiper assembly 36 will have returned to its original position and wiper 49 will reach break 51 in slip ring 50. At this point the dialing of the number is completed and the circuit to the motor 12 is opened so that the device stops. As has been described above, the device is now in its rest position and the circuit through the telephone instrument is closed so that the conversation can take place.

If it is desired to dial the same number a second time in succession, it is of course merely necessary to again depress the already depressed plunger sufficiently to momentarily close its override switch 65.

It will be seen from the foregoing that if the device is to be used for telephone dialing, each of the plungers 56 provided in the device must have seven rotary switches associated with it, each of these seven switches corresponding to one of the seven contact sections on the particular plunger. It will also be understood that any telephone number can very easily be set up by turning the seven switches 24 associated with the particular plunger desired to the seven digits of the desired telephone number. If it is desired to change any given number, this can be simply done by merely rotating the rotary switches. If a desired telephone number has less than seven digits, the unused switches 24 must be turned to one of the positions marked "No digit," in which the interrupter member is bypassed through wire 27 for the corresponding revolution of interrupter member 14. It is of course possible, instead of using rotary switches, to use a terminal board or strip on which the wires from each of the sections of each plunger could be fastened in any desired manner. This arrangement would have the advantage of lower cost but would of course make it a little less easy to set up or change a number.

Although only one particular embodiment of the device has been shown and described herein, it is of course to be understood that the principle of this device can be carried out in many different embodiments depending on the desired use without departing from the spirit of my invention. More particularly, the number of components, the number and arrangement of all contacts, and the ratio of gears 28 and 30 can be varied as required by the proposed use of the device, which is not restricted to automatic dialing. Inasmuch as my device is essentially a multi-sequence code transmitter, it can be used in any application requiring the production of multi-sequence code signals, such as remote-control or computer applications. In such applications, the conducting and insulated portions of the interrupted paths of contact plate 22 could simply be reversed if it is desired to produce pulses of current rather than pulsating interruptions of a circuit. For example, if a digital computer is so arranged as to require instructions in the form of "words" each consisting of seven numbers represented by electric current pulses, the device described above in connection with an automatic telephone dialing system could be used with only the following minor changes: The telephone instrument 76 would be replaced with an oscillator or other signal power source, the plug 80 would be plugged into the computer input, and a contact plate $22^a$ as shown in FIGURE 8 would be substituted for contact plate 22, so that the device would send out positive pulses instead of negative pulses (i.e., interruptions). As the never-break feature of the distributor would then no longer be necessary, one of the wipers 44, 46 could be omitted. By proper configuration of contact plate $22^a$ and the use of a proper number of distributor contacts 42 and switching components, an infinite variety of multi-sequence signals can be set up by the use of my invention.

I claim:

1. An automatic telephone dialing system comprising a transmission line; a plurality of first and second electrical circuits; means for simultaneously changing the conductive characteristics of each of said first electrical circuits in different predetermined patterns, said means causing said changes in conductive characteristics to be repeated at least a number of times equal to the number of said second electrical circuits, and means for electrically interconnecting selected ones of said first electrical circuits with said line separately during the first and each repeated change in conductive characteristics of said first circuits, said last mentioned means being arranged to selectively interconnect said first circuits with said line in a predetermined sequence.

2. A system according to claim 1 in which said last-named means includes a commutator and switches for connecting selected ones of said first-named means to the respective contacts of said commutator.

3. A system according to claim 1 in which said change of conductivity characteristics comprises a momentary opening of said circuit.

4. A system according to claim 1 in which said change of conductivity characteristics comprises a momentary closing of said circuit.

5. A system according to claim 1 in which the means for changing the conductive characteristics of the first circuits comprise contact fingers adapted to ride over spaced contacts mounted on a cyclically movable member.

6. An automatic telephone dialing system comprising a transmission line; a plurality of first and second electrical circuits; means for simultaneously changing the conductive characteristics of each of said first electrical circuits in different predetermined patterns, said means causing said changes in conductive characteristics to be repeated at least a number of times equal to the number of said second electrical circuits; a plurality of selector means each connected to one of said second circuits and each connected to each of said first circuits and adapted to selectively connect any one of said first circuits through one of said second circuits to said lines; and sequentially operated means associated with said second circuits for electrically connecting a selected one of said selector means to said line separately during the first and each repeated change in the conductive characteristics of said first circuits, said last mentioned means being arranged to selectively interconnect said selector means and thus said first circuits to said line in a predetermined sequence.

7. The device of claim 6 in which a plurality of arrays of said selector means is provided, each array having a plurality of selector means connected one to each of said second circuits; and a plurality of other selector means one electrically connected to each array, said other selector means each being connected between said sequentially operated means and said one of said arrays of selector means.

8. A system according to claim 6 in which the sequentially operated means comprises a wiper means riding over spaced contacts which are connected to said second circuits.

9. Apparatus for automatically transmitting pre-selected groups of telephone dialing signals comprising a transmission line, a signal-producing member having a plurality of simultaneously and recurrently operating signal-producing elements each of said elements being capable of creating one of a plurality of predetermined signals; means for actuating said signal-producing member as many times in succession as there are signals in one of said groups; a plurality of group selectors; a sequencing device for sequentially connecting said transmission line to a plurality of electrical circuits during the transmission of one of said groups; a plurality of signal selectors arranged in arrays, each array being associated with one of said group selectors, and each array comprising as many signal selectors as there are signals in a group; and means associated with each of said group selectors for connecting each of said electrical circuits to one of the signal selectors of the array associated with said group selector, each of said signal selectors being adapted to connect any one of said signal-producing elements to one of said electrical circuits through the group selector associated therewith.

10. Apparatus for automatically transmitting pre-selected groups of telephone dialing signals comprising a transmission line; a signal-producing member having a plurality of simultaneously and recurrently operating signal-producing elements, each of said elements being capable of creating one of a plurality of predetermined signals; a plurality of group selector means responsive to the actuation of one of said group selectors for actuating said signal-producing member as many times in succession as there are signals in one of said groups; a sequencing device for sequentially connecting said transmission line to a plurality of electrical circuits in response to operation of one of said group selectors, the shift from one of said circuits to the next occurring between the recurrent operations of said signal-producing elements; a plurality of signal selectors arranged in arrays, each array being associated with one of said group selectors, and each array comprising as many signal selectors as there are signals in a group; and means associated with each of said group selectors for connecting each of said electrical circuits to one of the signal selectors of the array associated with said group selector, each of said signal selectors being adapted to connect any one of said signal-producing elements to one of said electrical circuits through the group selector associated therewith.

11. The apparatus of claim 10, in which said transmission line is always connected to at least one of said electrical circuits while said sequencing device is operating.

References Cited in the file of this patent

UNITED STATES PATENTS

| | | |
|---|---|---|
| 1,969,978 | Hanel | Aug. 14, 1934 |
| 2,207,744 | Larson | July 16, 1940 |
| 2,255,201 | Wheelock | Sept. 9, 1941 |
| 2,649,513 | Luhn | Aug. 18, 1953 |
| 2,662,130 | Sealey | Dec. 8, 1953 |
| 2,861,130 | Yanagida | Nov. 18, 1958 |